United States Patent
Belvin et al.

(10) Patent No.: US 8,949,350 B2
(45) Date of Patent: Feb. 3, 2015

(54) TRACKING DESKTOP APPLICATION REFERRALS TO CONTENT DISTRIBUTED OVER A NETWORK

(75) Inventors: Marcus L. Belvin, Raleigh, NC (US); Matthew C. Hillary, Tyler, TX (US); Kimberly D. McCall, Leander, TX (US); Henri F. Meli, Cary, NC (US); Yingxin Xing, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/219,110

(22) Filed: Aug. 26, 2011

(65) Prior Publication Data

US 2013/0054705 A1 Feb. 28, 2013

(51) Int. Cl.
  *G06F 15/16* (2006.01)
  *G06Q 30/02* (2012.01)
(52) U.S. Cl.
  CPC .................................... *G06Q 30/02* (2013.01)
  USPC .......................................... 709/206; 709/217
(58) Field of Classification Search
  None
  See application file for complete search history.

(56) References Cited

U.S. PATENT DOCUMENTS

| 6,651,087 | B1 * | 11/2003 | Dennis ........................ 709/206 |
| 6,928,463 | B1 | 8/2005 | Tene et al. |
| 7,827,311 | B2 | 11/2010 | Cooley et al. |
| 2002/0015042 | A1 * | 2/2002 | Robotham et al. ............ 345/581 |
| 2003/0097443 | A1 * | 5/2003 | Gillett et al. ................. 709/225 |
| 2005/0076097 | A1 | 4/2005 | Sullivan et al. |
| 2008/0040653 | A1 | 2/2008 | Levine |
| 2009/0132481 | A1 | 5/2009 | Toub et al. |
| 2009/0172159 | A1 | 7/2009 | Kocol |
| 2009/0281852 | A1 | 11/2009 | Abhari et al. |
| 2009/0327863 | A1 | 12/2009 | Holt et al. |
| 2010/0263025 | A1 * | 10/2010 | Neitzel et al. ..................... 726/4 |
| 2010/0269044 | A1 | 10/2010 | Ivanyi et al. |
| 2010/0332488 | A1 | 12/2010 | Horvitz et al. |
| 2011/0149727 | A1 * | 6/2011 | Yoon et al. .................... 370/229 |
| 2011/0320555 | A1 * | 12/2011 | Qiu et al. ...................... 709/207 |

OTHER PUBLICATIONS

IBM; "Method to Centrally Collect and Manage Client-Side Logging and Traces Generated by a Web Application", IPCOM000194421D, Mar. 23, 2010, 6 pages.
IBM; "Method and System for Seamless and Trusted Context Switching Between Web Applications and Desktop Applications", IPCOM000183567D, May 27, 2009, 4 pages.
Sakurada et al.; "Extracting User Posting Behavior Using HTTP Flow", APSITT 8th Asia-Pacific Symposium on, Jun. 15-18, 2010, pp. 1-6.
Chen et al.; "Reverse Mapping of Referral Links From Storage Hierarchy for Web Documents", ICTAI Proceedings, 12th IEEE Inter. Conf. on, Nov. 13-15, 2000, pp. 216-219.
The Javascript Source: Miscellaneous: Bookmark Page; http://javascript.internet.com/miscellaneous/bookmark-page.html.

(Continued)

*Primary Examiner* — Mohamed Wasel
*Assistant Examiner* — Tsung Wu
(74) *Attorney, Agent, or Firm* — Yeen Tham; Edell, Shapiro & Finnan, LLC

(57) ABSTRACT

Tracking initiation of network content requests is achieved by receiving at a network device requests from clients for network content, and tracking initiation of network content requests based upon initiator information, wherein the initiator information comprises information relating to each type of application hosted by a client that initiates the client request for network content from the network device.

17 Claims, 2 Drawing Sheets

(56) References Cited

OTHER PUBLICATIONS

HTTP/1.1: Header Field Definitions; http://www.w3.org/Protocols/rfc2616/rfc2616-sec14.html.

Referrers and Search Engines tracking tutorial; http://www.web-stat.net/help_referrer_tracking.htm.

IBM; "A novel approach and system to enable mash-up between web application and desktop applications"; IPCOM000180507D; Mar. 11, 2009; 6 pages.

* cited by examiner

TRACKING DESKTOP APPLICATION REFERRALS TO CONTENT DISTRIBUTED OVER A NETWORK

BACKGROUND

1. Technical Field

The present invention relates to tracking referrals to network sites.

2. Discussion of the Related Art

Certain analytics software tools (e.g., Google Analytics, Unica NetInsight, and Coremetrics SurfAid) are utilized by Internet websites that provide the ability to view trends and provide other statistical information regarding how customers access such websites (e.g., which URLs referred these customers). For example, in many web browsers, when a link is clicked, an HTTP header is sent to the website associated with the link that contains the URL of the previous page. This can be useful data for the company hosting the Internet website, since this can provide the company with additional information regarding how potential customers are linking or being referred to the website which in turn allows the company to make more intelligent decisions about marketing and ways to distribute content associated with the website.

However, the referral information can only be sent when the referring entity is another web page (i.e., the referral URL). This results in a significant gap in referral data if large percentages of users are accessing content through other channels or mechanisms (e.g. email applications, IM clients, bookmarks, etc.).

BRIEF SUMMARY

Accordingly, embodiments of the present invention include a method, a computer program product and a system for tracking initiation of network content requests. Tracking initiation of network content requests is achieved by receiving at a network device requests from clients for network content, and tracking initiation of network content requests based upon initiator information, wherein the initiator information comprises information relating to each type of application hosted by a client that initiates the client request for network content from the network device.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product provide tracking initiation of network requests at a host or server of network content, where the tracking comprises identification of an application or application type that provides the referral for the network request.

As previously noted, certain analytic software tools provide the capability for website host servers to determine a referral website or the previous website from which a client browser traversed to reach the host server website. However, such analytical software tools are not capable of determining the referral source if such source is not a previous website.

As an example, assume a company's host server sends its newsletters to clients via email. The company may use an analytic software tool, such as Unica NetInsight, to track the impact of its newsletter campaigns. For example, the software tool may analyze page views and referrals to content at the host server website. A small percentage of the company's customers may post some of the links to the host server website on their blogs, using social media networks such as Twitter, etc. As a result, the referral data provided by the analytic software tool would show that a large percentage (e.g., 80% or greater) of the website page views had no referral. This is a common occurrence when utilizing such tools to identify referrals. The large percentage of "no referral" results provided by the analytic software tool is likely the result that the page views were actually referred by some other mechanism, such as a desktop application of the client, a bookmark of the client, the client actually typing or pasting the URL to the host server website page into the client's browser, the visit might come from a smart phone or an instant message communication, etc. With so much missing referral data that cannot be identified by a typical analytic software tool, it is hard for the company to adequately analyze how clients are directed to the company's website in order to make smart business decisions.

The embodiments of the invention facilitate identification of the different types of applications that would otherwise be unknown to analytical software tools used to analyze visitors at the host server website. For example, referrals to host server websites can be identified that originate from client applications including, without limitation, email applications, instant messaging applications, bookmarks of browser applications, smart phone applications, etc. Such additional information would allow the host server to tailor newsletters or other website information to clients using applications that visit the host server website more frequently. This also provides the host server with a more complete picture of how and in what different ways the website content is being accessed.

Figure 1:
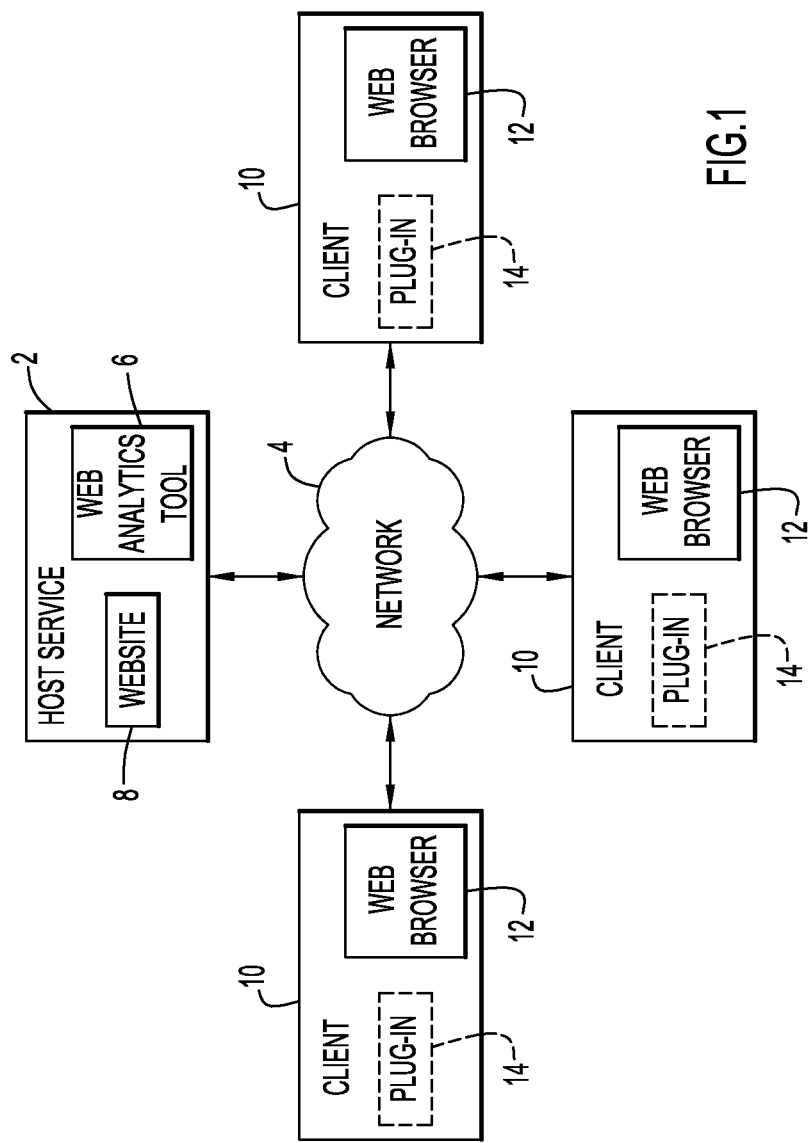
FIG. 1 is a diagrammatic illustration of an example computing system in accordance with an example embodiment of the present invention.

An example embodiment of the present invention is now described with reference to the block diagram of FIG. 1. A system comprises a host server 2 and a plurality of customers or clients 10 that may access network content provided by the host server 2 over a communication network 4. Three clients 10 are shown in the system of FIG. 1 for example purposes only, and it is understood that the system can include any suitable number of clients that communication over the communication network 4. The host server 2 communicates and exchanges information with each client 10 via the communication network 4, where the communication network 4 can be any suitable network (e.g., LAN, WAN, Intranet, Internet, etc.). In the example embodiments, the communication network 4 is a cloud network such as the Internet, and network content provided by the host server 2 comprises an Internet website that is accessible via a Uniform Resource Locator (URL) for the website.

Each of the host server and clients can be configured as any suitable one or more computer systems implemented by any type or types of processors or other hardware and/or other processing circuitry. In particular, each of the host server and clients may be implemented by any quantity of conventional or other computer systems or devices (e.g., computer terminals, personal computers of all configurations, including tablet, laptop, etc.), cellular telephones, personal data assistants, etc., and may include any available operating system and/or any available or custom software (e.g., browser software, communications software, word processing software, etc.). These systems may further include types of displays and input devices (e.g., keyboard, mouse, voice recognition, etc.) to enter and/or view information.

Each client 10 includes a web browser application 12 that facilitates receiving and providing information as well as traversing different host servers and/or other web resources over the communication network 4. Optionally, each client 10 may also include a plug-in application 14 that integrates with the web browser application 12 in order to provide further functional features as described in further detail below. The host server 2 includes an analytics software application 6 that facilitates features such as monitoring and tracking of visitors to a website hosted by the host server 4.

Identifier information is provided along with any request by a client 6 for access to network content of the host server 2. For example, when accessing the host server website 8, the web browser 12 of a client 10 provides the identifying information within an HTTP (Hypertext Transfer Protocol) header when a request is made to access the website 8. The identifying information comprises information about the application (e.g., what type of application) is initiating the request for website access. This identifying information is utilized by the web analytics software tool 6 of the host server 2 to analyze how clients are accessing the website 8. The identifying information can be provided in a typical HTTP header that is used to initiate a website access request. Alternatively, the identifying information can be provided in a HTTP header that is separate from the HTTP header requesting access by the client web browser 12 to the website 8.

Figure 2:
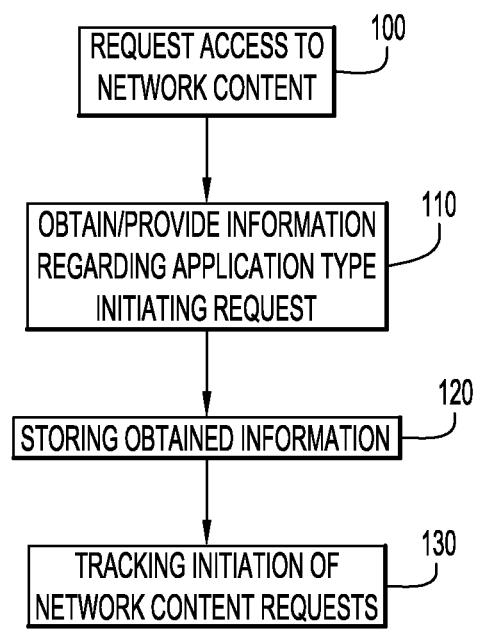
FIG. 2 provides a flowchart depicting an example method of tracking initiation of network requests in accordance with the present invention and utilizing the computer system of FIG. 1.

An example method for tracking initiation of network content requests utilizing the system of FIG. 1 is described with reference to the flowchart of FIG. 2. A client 10, using its web browser 12, makes a request to access the website 8 of the host server 2 (step 100). In particular, an HTTP header is sent to the website 8 by the client web browser 12 making this request. In accordance with HTTP standards (HTTP/1.1), the HTTP header can include a referrer request-header field that allows the client to specify, for the host server's benefit, the address (Uniform Resource Identifier) of the resource from which the Request-URI was obtained. This request-header field allows a host server to utilize a web analytics software tool 6, for example, to obtain and log information regarding referral websites for the host server website 8.

Information regarding the type of application associated with the client web browser 12 that initiates the network content request is obtained by the host server 2 (e.g., using the web analytics tool 6) and/or provided by the client web browser 12 (step 110). This information can be provided as part of the request-header field and/or as an additional one or more fields in the HTTP header making the access request and/or in an additional HTTP header that accompanies the HTTP header making the access request. Thus, the initiator application information provides information regarding how the URL for the website 8 was loaded into the web browser 12 of the client 10.

The initiator application information can be determined by the client 10, via the web browser 12, and/or by the host server 2 (e.g., via the web analytics software tool 6).

In an example embodiment, a client web browser 12 determines the initiator application information. This can be performed natively by the web browser or, optionally, via a plug-in software tool 14, that is installed in and thus integrated with the web browser. A plug-in software tool 14 could be configured to provide information regarding how the web browser 12 was started, i.e., information about which type of application operated to cause the web browser to navigate to the URL of the website 8 (e.g., an email application, from an editable document such as a word processing document, PDF document, spreadsheet document, etc., from an instant message or video conferencing application, etc.). As an example, a word processing application can invoke operation of the web browser 12 in scenarios in which, for example, the word processing application includes text beginning with "http://" or "www.". By clicking on such text within the word processing document, the web browser is loaded with the URL for initiating a request for access to the website associated with the URL. In such a scenario, the web browser 12 and/or plug-in software tool 14 associated with the web browser would provide initiator application information in an HTTP header to the host server 2 regarding the word processing application that was the referral source for the URL. The web browser 12 and/or plug-in software tool 14 can further be configured to provide information regarding applications that are currently running with the web browser 12.

Initiator application information can include different categories to describe the initiating or referral application. Some example categories to describe initiator applications include, without limitation: "bookmark" (to designate that the website URL was initiated by a bookmark selection in the web browser 12), "instant messenger" (to indicate an instant message application from which the website URL was obtained), "mailer" (to indicate an email application from which the website URL was obtained), "text editor" (to indicate an editable text application from which the website URL was obtained, where specific types of editable applications can also be identified, e.g., specific types of word processing applications, specific types of spreadsheet applications, etc.), "video conference" (to indicate a video conferencing application from which the website URL was obtained), etc.

When a call by an application being run by the client 10 initiates a loading of the web browser 12 with the specific URL for the host server website 8, the web browser 12 captures certain details associated with the initiator application and forwards this information in one or more HTTP headers as described above. The analytics software tool 6 of the host server 2 would then obtain this information from the HTTP header(s).

In another example embodiment, the web analytics tool 6 of the host server 2 may include a suitable software platform that also determines how a URL for the website 8 was loaded by the web browser 12 of a client 10. For example, a web analytics tool 6 could utilize software that is deployed on the website 8 (e.g., utilizing software such as Java or ActiveX control) that obtains information associated with the web browser 12, including how a URL may have been loaded by the web browser 12, and provide such information to the web analytics tool 6. For example, when a client 10 receives a link to a URL (e.g., via an email message), the operating system of the client 10 stores information regarding the initiator of the URL when the URL is accessed by the client's web browser 12. The host server 2 can include an applet at its website 8 for first time visitors, such as the client 10 accessing the website 8 via the URL, that provides a certificate requesting consent to access such information stored on by the operating system of the client 10. If the client 10 accepts the certificate, the host server 2 can access the initiator information stored by the client 10. However, if the client 10 rejects the certificate, the host server 2 will be denied access to this information stored by client 10.

In this embodiment, the host server 2 does not need to rely on a particular web browser implementation to retrieve certain types of initiation application information. However, since the information is being determined on the host server side, the types of information that can be obtained may be limited. In addition, as noted above, there may be some requirement for client permission to obtain initiator information stored by a client before the host server can obtain such information. Therefore, it is preferable for a client's web browser 12 to provide initiator application information or to use a combination of client web browser and web analytics tool on the host server side to obtain the desired information.

After the initiator application information is determined and obtained by or provided to the host server 2, the host server 2 stores such information (step 120) in a memory cache 7. The initiator application information stored in the memory cache 7 is then used by the web analytics software tool 6 of the host server 2 to track information regarding how access requests to the website 8 are initiated. For example, information such as a percentage for each application type that requests access to the website 8 based upon the total number of requests can be determined as well as other information that may help the host server understand how the website is being accessed, enhance the website content, provide better access for certain application types, obtain a deeper understanding and analysis of how referrals to the website content are occurring at any given time, etc. This in turn allows the host server 2 to have more analytical information at its disposal to assist in making smarter and better informed business decisions in relation to the website 8 and content on the website 8.

The embodiments of the invention can provide initiator application information for a number of different scenarios. In an example scenario, consider an email application (e.g., Microsoft Outlook or Lotus Notes) being run by a client 10. The client user receives an email that contains a link which corresponds with the URL of the website 8. When the user clicks on the link within the email, the web browser 12 is loaded with the URL, and the browser 12 (or the plug-in software tool 14 installed with the web browser 12) obtains the initiator application information at this time as the email application and provides this information in a header HTTP to the website 8 (e.g., provided as a field within the HTTP request header or in a different HTTP header). The information can simply be a general category (e.g., "mailer") or, alternatively, the specific email application that served as the referral source for the URL loaded by the web browser 12. The host server 2 is thus provided with initiator application information that can be used by its web analytics tool 6 to track website content requests.

In another example scenario, assume that the link to the host server website 8 has been bookmarked by the user of the web browser 12 for a client 10. When the user decides to request access to this website 8, the user selects this link from the bookmarks associated with the web browser 12, and the web browser (and/or the plug-in software tool 14 associated with the web browser) provides a category of initiator application information (e.g., bookmark") in an HTTP header to the website 8. This information is utilized by the host server 2 to track website content requests, using the web analytics tool 6.

In a further example scenario, a client 10 may be utilizing a communication application that facilitates a conference call or an instant messaging/chat session, e.g., over the communication network 4. A user of the client application may click on a link that is provided by the communication application and that corresponds with the URL of the website 8, and this results in the loading of this URL by the web browser 12. As with the other example scenarios, the web browser 12 (e.g., with the assistance of the plug-in software tool 14) provides initiator application information (e.g., in the form of a category, such as "conference call" or "instant message") to the website 8 in an HTTP header.

Thus, the embodiments of the present invention facilitate tracking of initiator applications that request access to network content so as to provide an enhanced and more informative understanding by the host server of how the network content is being accessed. This further allows the host server to understand how the website is being accessed, enhance the website content, provide better access for certain application types, obtain a deeper understanding and analysis of how referrals to the website content are occurring at any given time, etc. This in turn allows the host server to make well informed business decisions regarding website accessibility and content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of tracking initiation of network content requests comprising:
    receiving, at a network device hosting a website, requests from client web browsers for network content from that website; and
    tracking initiation of network content requests by client applications other than the client web browsers based upon initiator information inserted within the requests by the client web browsers, wherein the initiator information comprises information relating to each type of client application that originates and provides an address of the website to a corresponding client web browser, and wherein the tracking includes:
        extracting the initiator information from the requests received from the client web browsers;
        storing the extracted initiator information at the network device;
        analyzing the stored initiator information to determine the types of the client applications initiating the network content requests to access the website; and
        producing analytics for the website access based on the analyzed initiator information to identify alterations for the website in accordance with the determined types of the client applications.

2. The method of claim 1, wherein the initiator information is determined by the network device.

3. The method of claim 1, further comprising:
    providing network content to clients at the website hosted by the network device, wherein the website is accessible to each client via a uniform resource locator (URL) located within an application associated with each client.

4. The method of claim 3, wherein at least one request is received from a web browser of a client utilizing the URL.

5. The method of claim 4, wherein the initiator information for the at least one request is received in a hypertext transfer protocol (HTTP) header portion of the request.

6. The method of claim 4, wherein the web browser includes a plug-in software tool that determines the initiator information relating to the type of client application that initiates operation of the web browser to transmit the request to the website.

7. The method of claim 1, wherein the type of client application initiating a request for network content comprises at least one of an instant message application, an email application, an editable text application and a video conferencing application.

8. A system for tracking initiation of network content requests comprising:
   a network device hosting a website and including a processor configured with logic to:
      receive requests from client web browsers for network content from that website provided by the network device; and
      track initiation of network content requests by client applications other than the client web browsers based upon initiator information inserted within the requests by the client web browsers, wherein the initiator information comprises information relating to each type of client application that originates and provides an address of the website to a corresponding client web browser, and wherein the tracking includes:
      extracting the initiator information from the requests received from the client web browsers;
      storing the extracted initiator information;
      analyzing the stored initiator information to determine the types of the client applications initiating the network content requests to access the website; and
      producing analytics for the website access based on the analyzed initiator information to identify alterations for the website in accordance with the determined types of the client applications.

9. The system of claim 8, wherein the processor is further configured with logic to determine each type of client application initiating a request for network content.

10. The system of claim 8, wherein the website provides network content to requesting clients, and is accessible to each client via a uniform resource locator (URL) located within an application associated with each client.

11. The system of claim 10, wherein the initiator information for at least one request is received by the network device in a hypertext transfer protocol (HTTP) header portion of the at least one request.

12. The system of claim 8, wherein the type of client application initiating a request for network content comprises at least one of an instant message application, an email application, an editable text application and a video conferencing application.

13. A computer program product for tracking initiation of network content requests, the computer program product comprising:
   a computer readable memory device having computer readable program code embodied therewith, the computer readable program code configured to:
      receive requests from client web browsers for network content from a website; and
      track initiation of requests for network content by client applications other than the client web browsers based upon initiator information inserted within the requests by the client web browsers, wherein the initiator information comprises information relating to each type of client application that originates and provides an address of the website to a corresponding client web browser, and wherein the tracking includes:
      extracting the initiator information from the requests received from the client web browsers;
      storing the extracted initiator information;
      analyzing the stored initiator information to determine the types of the client applications initiating the network content requests to access the website; and
      producing analytics for the website access based on the analyzed initiator information to identify alterations for the website in accordance with the determined types of the client applications.

14. The computer program product of claim 13, wherein the computer readable program code is further configured to determine each type of client application initiating a request for network content.

15. The computer program product of claim 13, wherein the computer readable program code is further configured to provide network content to requesting clients via the website, and the website is accessible to each client via a uniform resource locator (URL) located within an application associated with each client.

16. The computer program product of claim 15, wherein the computer readable program code is further configured to receive initiator information for at least one request in a hypertext transfer protocol (HTTP) header portion of the at least one request.

17. The computer program product of claim 13, wherein the type of client application initiating a request for network content comprises at least one of an instant message application, an email application, an editable text application and a video conferencing application.

* * * * *